Patented July 7, 1931

1,813,641

UNITED STATES PATENT OFFICE

ALWIN SCHNEEVOIGT, OF LUDWIGSHAFEN-ON-THE-RHINE, AND KARL ANACKER, OF MANNHEIM, GERMANY, ASSIGNORS TO GENERAL ANILINE WORKS, INC., OF NEW YORK, N. Y., A CORPORATION OF DELAWARE

FAST PRINTS ON VEGETABLE FIBERS

No Drawing. Application filed November 20, 1928, Serial No. 320,748, and in Germany November 28, 1927.

The present invention relates to an improvement in the production of prints of chromium compounds of azo dyestuffs on the vegetable fibre.

We have found that prints of excellent fastness on vegetable fibres of chromium compounds of azo dyestuffs, particularly of o-hydroxy azo dyestuffs, are obtained in a simple manner, by employing strongly acid printing pastes which contain free organic acids, such as acetic, formic, citric, tartaric or oxalic acid, and cotton mordants, for instance chromium, iron or aluminium salts. The prints obtained in accordance with this process are mostly well fixed after steaming for only 5 minutes in a Mather-Platt apparatus.

The following examples will further illustrate the nature of the said invention, but the invention is not restricted to these examples. The parts are by weight.

Example 1

A paste prepared from 30 parts of the chromium compound of the azo dyestuff obtainable from 5-nitro-2-amino phenol and 2-naphthyl amine-5-sulfonic acid, 50 parts of thiodiglycol, 100 parts of 30 per cent acetic acid, 80 parts of chromium acetate, 640 parts of acetic acid-starch-tragacanth paste containing 70 parts of dry starch, 8 parts of dry gum tragacanth and 65 parts of a 30 per cent acetic acid, and 100 parts of water, is printed on cotton. The material is then steamed for 5 minutes in a Mather-Platt apparatus or for 1 hour in a boiler, rinsed, and soaped. A bright blue-green print is obtained, which is fast to light.

Example 2

A paste according to Example 1, prepared from the chromium compound of the azo dyestuff obtainable from 1-amino-2-naphthol-4-sulfonic acid and 1-naphthol-8-sulfonic acid, and which contains 25 parts of chromium acetate for each 30 parts of the chromium compound of the said dyestuff, produces bright blue prints on cotton by the process described in accordance with the preceding Example 1.

What we claim is:—

1. A process of producing fast prints of chromium compounds of azo dyestuffs on vegetable fibres which comprises employing strongly acid printing pastes containing a free organic acid and a cotton mordant.

2. A process of producing fast prints of chromium compounds of azo dyestuffs on vegetable fibres which comprises employing strongly acid printing pastes containing acetic acid and chromium acetate.

3. As new articles of manufacture, pastes for printing vegetable fibres comprising a chromium compound of an azo dyestuff, a free organic acid and a cotton mordant.

4. As new articles of manufacture, pastes for printing vegetable fibres comprising a chromium compound of an azo dyestuff, acetic acid and a cotton mordant.

5. As new articles of manufacture, pastes for printing vegetable fibres comprising a chromium compound of an azo dyestuff, acetic acid and chromium acetate.

In testimony whereof we have hereunto set our hands.

ALWIN SCHNEEVOIGT.
KARL ANACKER.